(12) United States Patent
Ohlsen et al.

(10) Patent No.: US 6,720,105 B2
(45) Date of Patent: *Apr. 13, 2004

(54) METALLIC BLOCKING LAYERS INTEGRALLY ASSOCIATED WITH FUEL CELL ELECTRODE STRUCTURES AND FUEL CELL ELECTRODE STACK ASSEMBLIES

(75) Inventors: Leroy J. Ohlsen, Gold Bar, WA (US); Aaron M. Cooke, Seattle, WA (US); Jonathan C. Mallari, Seattle, WA (US); Chung M. Chan, Bellevue, WA (US)

(73) Assignee: Neah Power Systems, Inc., Bothell, WA (US)

( * ) Notice: Subject to any disclaimer, the term of this patent is extended or adjusted under 35 U.S.C. 154(b) by 396 days.

This patent is subject to a terminal disclaimer.

(21) Appl. No.: 09/839,787

(22) Filed: Apr. 19, 2001

(65) Prior Publication Data

US 2002/0048703 A1 Apr. 25, 2002

Related U.S. Application Data

(63) Continuation-in-part of application No. 09/715,830, filed on Nov. 17, 2000.
(60) Provisional application No. 60/200,866, filed on May 2, 2000, provisional application No. 60/189,205, filed on Mar. 14, 2000, and provisional application No. 60/166,372, filed on Nov. 17, 1999.

(51) Int. Cl.⁷ ............................. H01M 4/86; H01M 4/94
(52) U.S. Cl. ............................. 429/41; 429/40; 429/44
(58) Field of Search ........................... 429/40, 41, 44

(56) References Cited

U.S. PATENT DOCUMENTS

| | | | |
|---|---|---|---|
| 3,506,561 A | | 4/1970 | Ceasar ..................... 204/290 |
| 5,139,895 A | * | 8/1992 | Roy et al. ................. 429/17 |
| 5,262,021 A | | 11/1993 | Lehmann et al. .......... 204/129 |

FOREIGN PATENT DOCUMENTS

| | | |
|---|---|---|
| DE | 19757320 | 7/1999 |
| DE | 19820756 C1 | * 11/1999 |
| RU | 2148878 | 5/2000 |
| WO | WO 95/13869 | 5/1995 |
| WO | WO 99/39398 A1 | * 8/1999 |
| WO | WO 00/45457 | 8/2000 |
| WO | WO 00/69007 | 11/2000 |

OTHER PUBLICATIONS

Kelly et al; Sep. 2000; No. XP–002196002; abstract; "A miniature methanol/air polymer electrolyte fuel cell"; Electrochemical and Solid State Letters; vol. 3, No. 9; pp. 407–409.

Kendall, DL; Jul. 1990; No. XP000223116; abstract; "A New Theory for the Anisotropic Etching of Silicon and Some Underdeveloped Chemical Micromachining Concepts"; p. 3604, Journal of Vacuum Science and Technology, vol. 8, No. 4.

* cited by examiner

Primary Examiner—Randy Gulakowski
Assistant Examiner—Jonathan Crepeau
(74) Attorney, Agent, or Firm—Thomas E. Loop

(57) ABSTRACT

Metallic blocking layers integrally associated with fuel cell electrode structures and fuel cell electrode stack assemblies, as well as to methods relating thereto, are disclosed herein. More specifically, the present invention is directed to a metallic blocking layer integrally associated with an electrode structure of a fuel cell system such as, for example, a direct methanol fuel cell system. In this embodiment, the invention may be characterized in that the electrode structure comprises an inorganic (i.e., noncarbonaceous) support substrate having one or more discrete porous regions, wherein the one or more discrete porous regions is defined by an array of acicular pores disposed across the top surface area of the electrode structure such that at least a portion of the blocking layer covers the top surface area and protrudes into the array of acicular pores. The blocking layer is preferably a substantially voidless metallic membrane that is substantially impermeable to at least methanol and is substantially permeable to hydrogen atoms.

5 Claims, 5 Drawing Sheets

(2 of 5 Drawing Sheet(s) Filed in Color)

METALLIC BLOCKING LAYERS INTEGRALLY ASSOCIATED WITH FUEL CELL ELECTRODE STRUCTURES AND FUEL CELL ELECTRODE STACK ASSEMBLIES

CROSS-REFERENCE TO RELATED APPLICATIONS

This application is a continuation-in-part of U.S. patent application Ser. No. 09/715,830 filed Nov. 17, 2000; which application claims priority to U.S. Provisional Patent Application No. 60/200,866 filed May 2, 2000; U.S. Provisional Patent Application No. 60/189,205 filed Mar. 14, 2000; and U.S. Provisional Patent Application No. 60/166,372 filed Nov. 17, 1999; all of which are incorporated herein by reference in their entireties.

TECHNICAL FIELD

The present invention relates generally to fuel cell systems and, more specifically, to metallic blocking layers integrally associated with fuel cell electrode structures and fuel cell electrode stack assemblies.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or methanol, to electrical power through an electrochemical process rather than combustion. It does so by harnessing the electrons released from controlled oxidation-reduction reactions occurring on the surface of a catalyst. A fuel cell system can produce electricity continuously so long as fuel is supplied from an outside source.

In electrochemical fuel cell systems employing methanol as the fuel supplied to the anode (also commonly referred to as a "Direct Methanol Fuel Cell" (DMFC) system), the electrochemical reactions are essentially as follows: first, a methanol molecule's carbon-hydrogen, and oxygen-hydrogen bonds are broken to generate electrons and protons; simultaneously, a water molecule's oxygen-hydrogen bond is also broken to generate an additional electron and proton. The carbon from the methanol and the oxygen from the water combine to form carbon dioxide. Oxygen from air supplied to the cathode is reduced to anions with the addition of electrons. From a molecular perspective, the electrochemical reactions occuring within a direct methanol fuel cell (DMFC) are as follows:

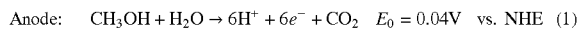
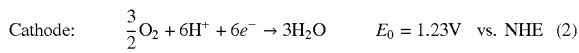
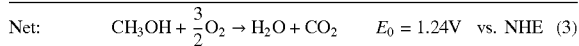

The various electrochemical reactions associated with other state-of-the-art fuel cell systems (e.g., hydrogen or carbonaceous fuel) are likewise well known to those of ordinary skill in the art.

With respect to state-of-the-art direct liquid feed fuel cell systems (e.g., DMFC systems), several different configurations and structures have been contemplated such as, for example, an electrode assembly that utilizes a solid polymer electrolyte (SPE). Because the polymer electrolyte is typically cast as a solid membrane, this type of electrode assembly is commonly referred to as a "membrane electrode assembly" (MEA). A typical MEA consists essentially of a proton conducting membrane (i.e., the solid polymer electrolyte) sandwiched between two platinum coated electrode structures. A significant problem, however, with DMFC systems having MEAs is a phenomenon known as "methanol cross-over." As is depicted in prior art FIG. 1, methanol in conventional DMFCs has a tendency to cross-over from the anode to the cathode via diffusion (i.e., it migrates through the electrolyte), where it adsorbs onto the cathode catalyst and reacts with oxygen from the air resulting in a parasitic loss of methanol fuel and concomitant reduction in fuel cell voltage. Indeed, performance losses of 40–100 mV at a given current density have been observed at the cathode of DMFCs utilizing a direct methanol feed (Potje-Kamloth et al., *Abstract No. 105, Extended Abstracts* 92-2, "Fall Meeting of the Electrochemical Society" (1992), Kuver et al., *J. Power Sources* 52:77 (1994)).

Conventional attempts for reducing methanol cross-over in DMFC systems having MEAs include structural modifications of the central solid polymer membrane. Exemplary in this regard are the MEAs disclosed in (1) U.S. Pat. No. 4,664,761 to Zupancic et al. (discloses proton-conducting membrane made of an interpenetrating polymer network); (2) U.S. Pat. No. 5,672,438 to Banarjee et al. (discloses proton-conducting laminated membrane); and (3) U.S. Pat. No. 5,919,583 to Grot et al. (discloses proton-conducting membrane that includes an inorganic filler). Although the various MEA designs disclosed in these patents are able to reduce methanol cross-over to some degree, they nevertheless still have relatively high methanol permeabilities.

Other attempts for reducing methanol cross-over include the incorporation of a metal hydride barrier layer into the electrode assembly. Exemplary in this regard are the metal hydride barrier layers disclosed in (1) Pu et al., "A Methanol Impermeable Proton Conducting Composite Electrolyte System," *J. Electrochem. Soc.,* 142(7):119–120 (July 1995) (discloses a three-layered laminar electrolyte consisting of a palladium foil layer sandwiched between two polymeric electrolytes); (2) U.S. Pat. No. 5,759,712 to Hockaday (discloses a semi-permeable plastic electrode structure having a top palladium membrane that contains numerous swellable voids); and (3) U.S. Pat. No. 5,846,669 to Smotkin et al. (discloses a hybrid electrolyte system consisting of an acid electrolye, a base electrolyte, and an interposing palladium foil layer). Although the various MEA designs disclosed in these patents are better able to reduce methanol cross-over than other conventional designs, they too are also less than optimal because of problems related to cracking and delamination. In short, these state-of-the-art hydrogen permeable metallic blocking layers are known to experience problems with cracking and/or delamination (due to hydration cycling).

Although significant progress has been made with respect to these and other fuel cell system problems, there is still a need in the art for improved electrode structure and metallic layer or membrane combinations for reducing liquid (e.g., methanol) cross-over in fuel cell electrode assemblies. The present invention fulfills these needs and provides for further related advantages.

SUMMARY OF THE INVENTION

In brief, the present invention relates generally to fuel cell systems and, more specifically, to metallic blocking layers integrally associated with fuel cell electrode structures and fuel cell electrode stack assemblies, as well as to methods relating thereto. In one embodiment, the present invention is directed to a metallic blocking layer integrally associated with an electrode structure of a fuel cell system such as, for example, a direct methanol fuel cell system. In this embodiment, the invention may be characterized in that the electrode structure comprises an inorganic (i.e., noncarbonaceous) support substrate having one or more discrete porous regions, wherein the one or more discrete porous regions is defined by an array of acicular pores disposed across the top surface area of the electrode structure such that at least a portion of the blocking layer covers the top surface area and protrudes into the array of acicular pores. The blocking layer is preferably a substantially voidless metallic membrane that is substantially impermeable to at least methanol and is substantially permeable to hydrogen atoms.

In another embodiment, the present invention is directed to an electrode assembly adapted for use with a fuel cell system. In this embodiment, the electrode assembly comprises an anode and an opposing cathode. More specifically, the cathode includes one or more discrete cathode porous regions, wherein the one or more discrete cathode porous regions is defined by an array of acicular pores, and wherein a top surface of the cathode has thereon a metallic blocking layer defined by a metallic membrane that is substantially impermeable to at least methanol and is substantially permeable to hydrogen atoms. In contrast, the anode includes one or more discrete anode porous regions, wherein the one or more discrete anode porous regions is defined by an array of anodic acicular pores. The anode and the cathode are spaced apart and substantially parallel to each other so as to define a spaced apart region that is adjacent to the metallic blocking layer.

In yet another embodiment, the present invention is directed to a metallic blocking layer in combination with an inorganic electrode structure of a fuel cell system. In this embodiment, the inorganic electrode structure comprises a bulk matrix having a plurality of acicular pores that extend into the bulk matrix from a top surface. The metallic blocking layer resides on the top surface, and wherein of the blocking layer extends into the plurality of acicular pores. The metallic blocking layer may comprise or consist essentially of a central transition metal diffusion layer (such as, for example, vanadium) having palladium reaction layers on either side.

These and other aspects of the present invention will become more evident upon reference to following detailed description and attached drawings. It is to be understood that various changes, alterations, and substitutions may be made to the teachings contained herein without departing from the spirit and scope of the present invention. It is to be further understood that the drawings are illustrative (hence, not necessarily to scale) and symbolic representations of exemplary embodiments of the present invention.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

The present invention is directed to metallic blocking layers integrally associated with fuel cell electrode structures and fuel cell electrode stack assemblies, as well as to methods relating thereto. The electrode structures of the present invention are characterized in that they are generally made from an inorganic or noncarbonaceous substrate such as, for example, a silicon wafer, a sol-gel derived support struture, or a combination thereof. An important feature of these types of novel inorganic support substrates is that they may be manufactured so as to comprise a plurality of catalytic active porous regions (i.e., volumetric regions within the fuel cell electrode where the electrochemical oxidation-reduction reactions between chemical species take place). These volumetric active porous regions are extremely useful for obtaining relatively high power densities in miniature fuel cell systems, but only to the extent that problems associated with fuel cross-over are obviated. Unlike conventional graphite or plastic electrode support structures, the novel inorganic support substrates disclosed herein (1) are able to form an adhesion or fusion bonding layer (between the metallic blocking layer and the support substrate) that mitigates problems associated with delamination, and (2) are able to define an array of pores (e.,g, a pattern of columns that extends into the inorganic bulk matrix) that provides an expansion route that mitigates problems associated with cracking. These improved physical characteristics are due, in large part, to the crystalline nature of the underlying inorganic substrates and support structures (whereby their crystalline nature makes them particularly amenable to forming fusion bonds with metals).

Figure 1:
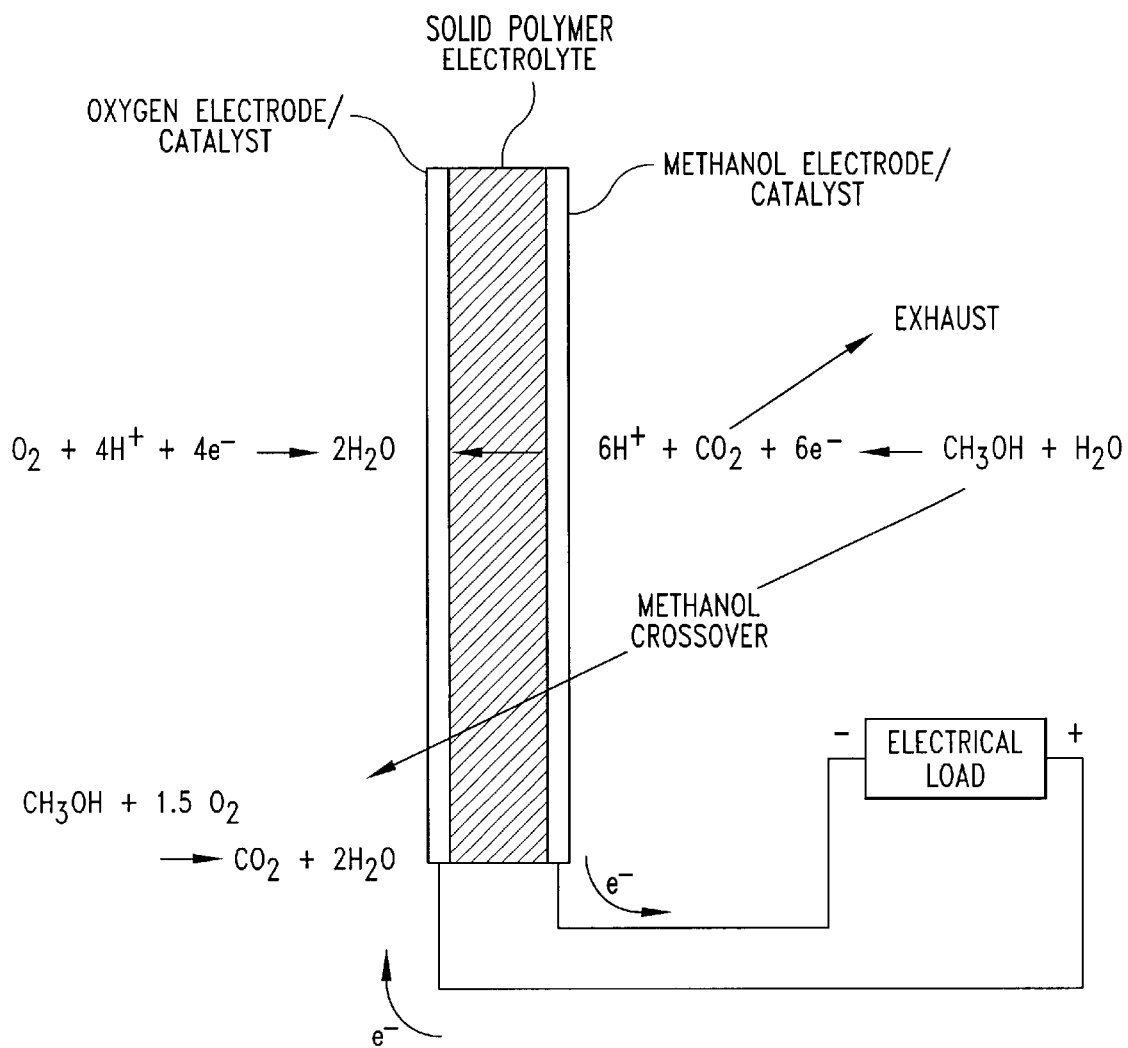
FIG. 1 illustrates a schematic representation of a membrane electrode assembly of a direct methanol fuel cell system in accordance with the prior art.
Figure 2:
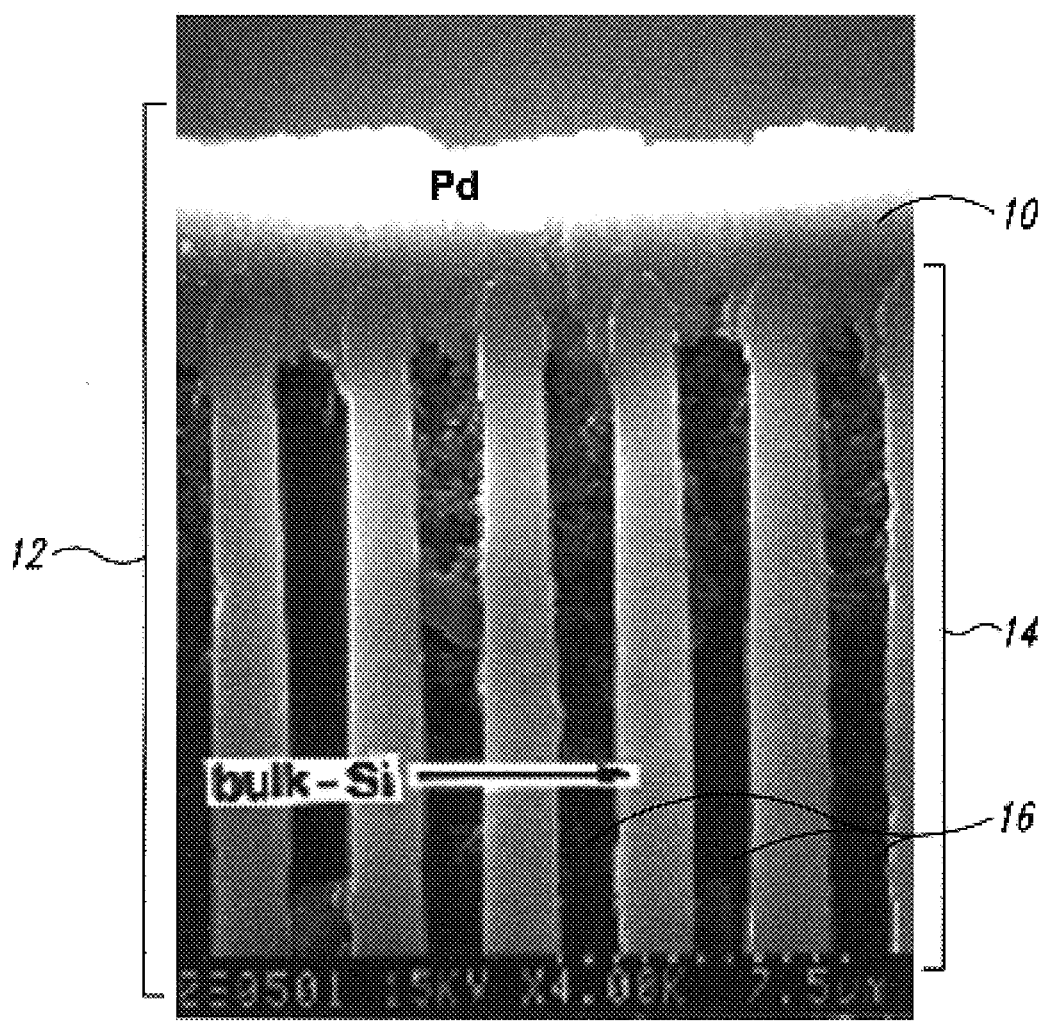
FIG. 2 shows a side cross-sectional view of a porous silicon electrode having thereon a palladium blocking layer in accordance with an embodiment of the present invention.
Figure 3:
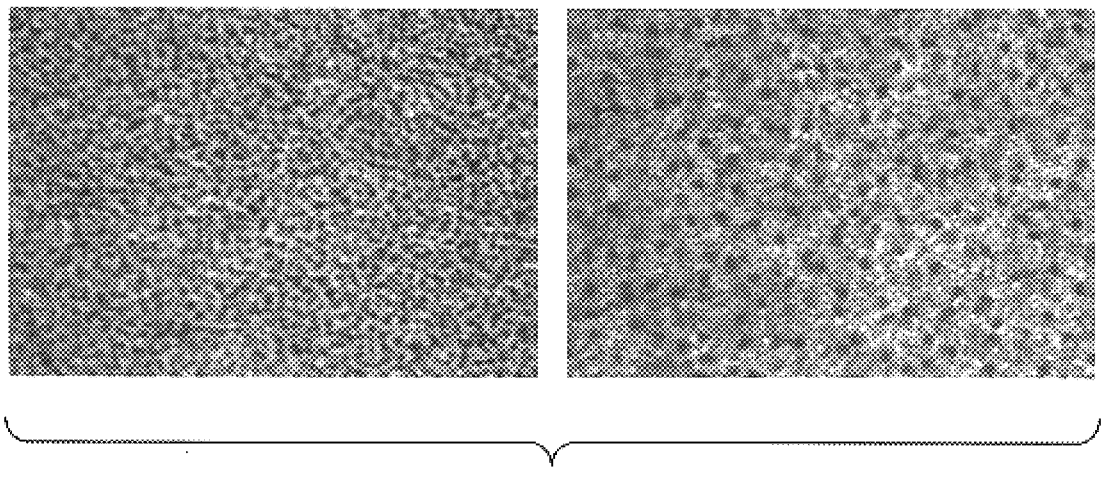
FIG. 3 illustrate a magnified top view of a porous silicon substrate having an array of acicular pores useful as a support substrate in accordance with an embodiment of the present invention.
Figure 4:
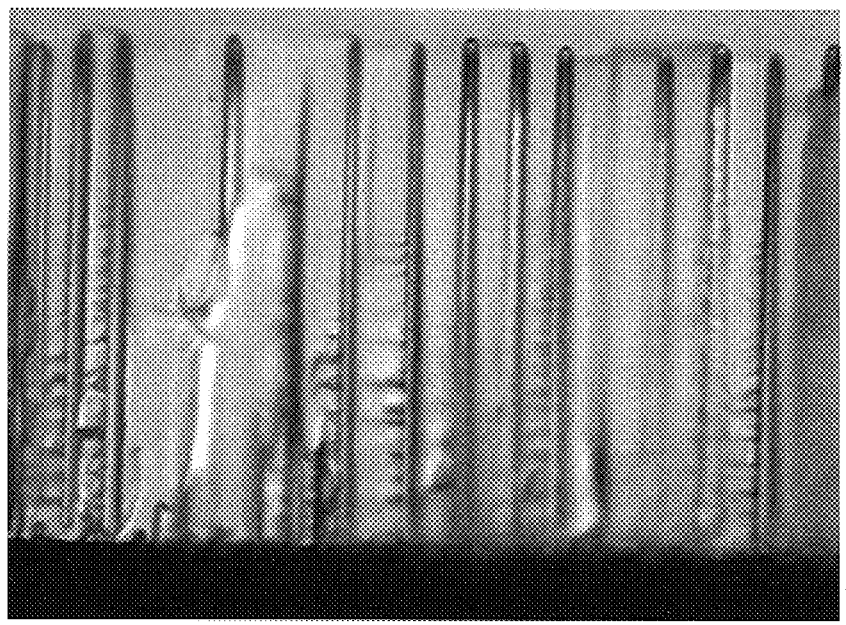
FIG. 4 illustrates a magnified side view of a porous silicon substrate having an array of acicular pores useful as a support substrate in accordance with an embodiment of the present invention.
Figure 5:
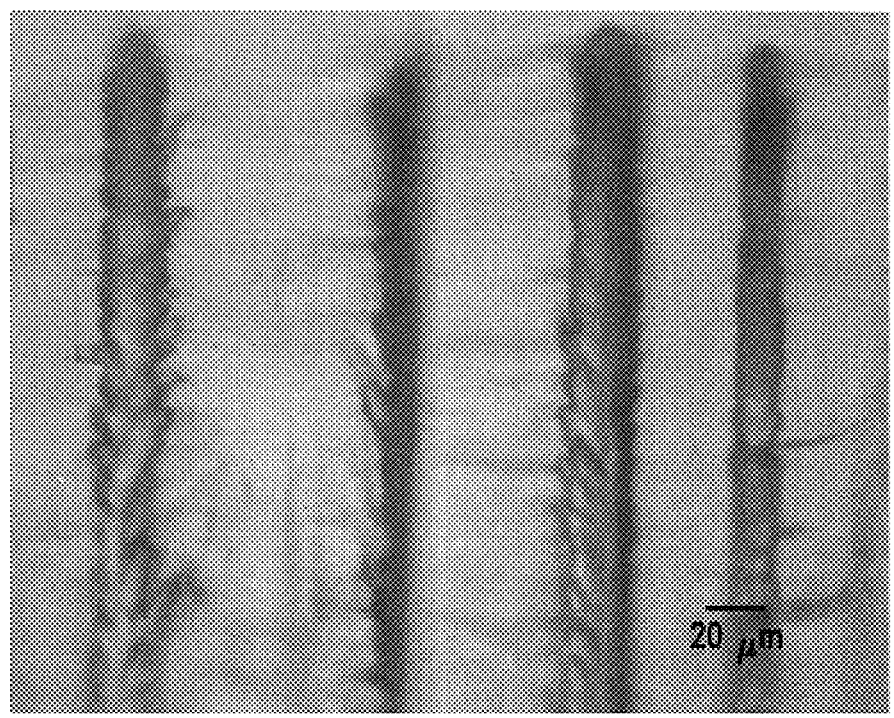
FIG. 5 illustrates a further magnified side view of the porous silicon of FIG. 4.
Figure 6:
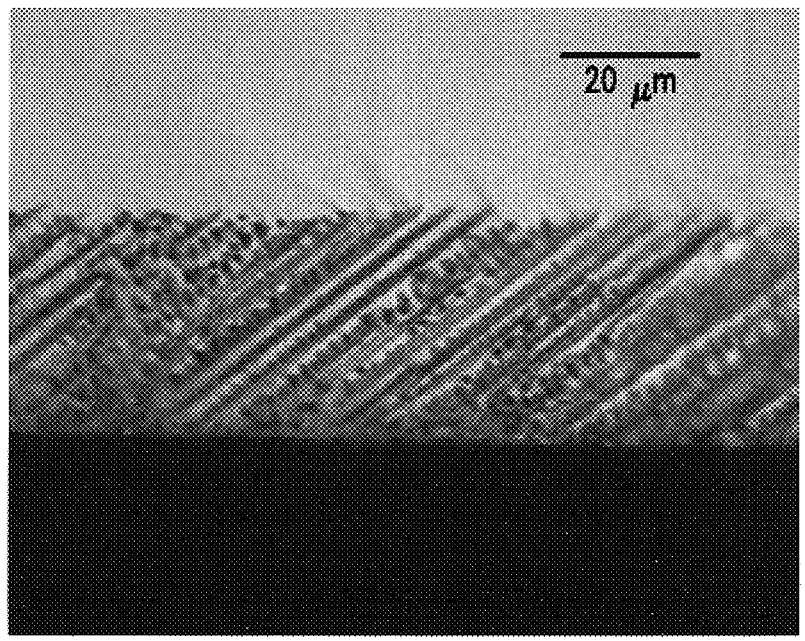
FIG. 6 illustrates a magnified side view of a porous silicon substrate useful as a support substrate in accordance with an embodiment of the present invention.
Figure 7:
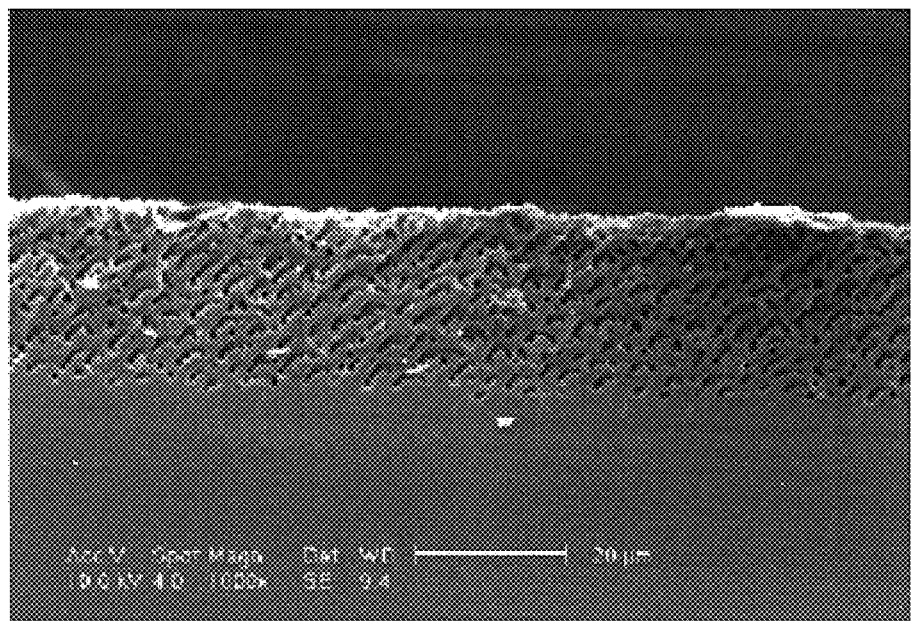
FIG. 7 illustrates a magnified side view of a porous "Kielovite" silicon substrate useful as a support substrate in accordance with an embodiment of the present invention.
Figure 8:
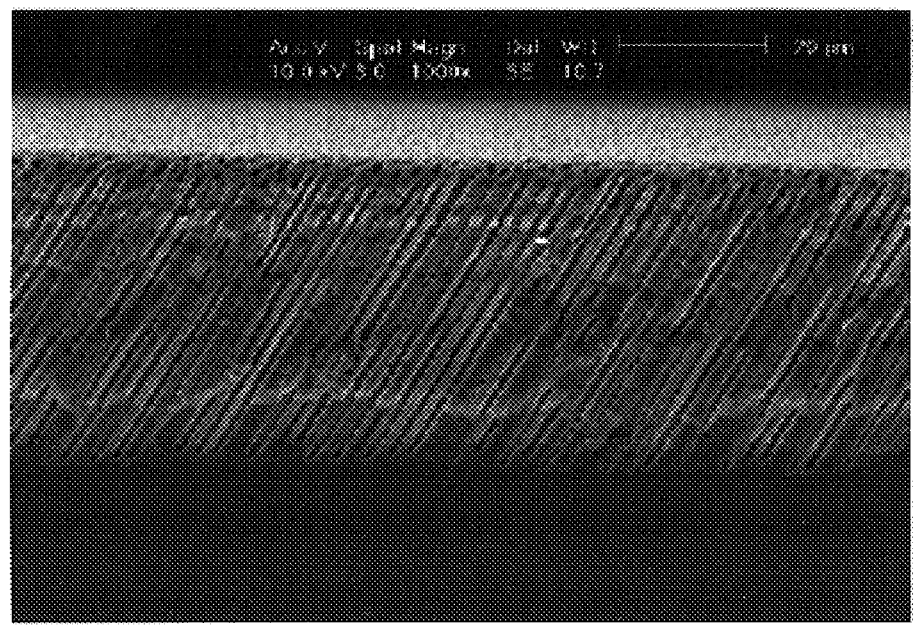
FIG. 8 illustrates a magnified side view of a porous silicon substrate useful as a support substrate in accordance with an embodiment of the present invention.

Thus, and with reference to FIG. 2, the present invention is directed to a palladium blocking layer 10 integrally associated with an electrode structure 12 of a fuel cell system (not shown) such as, for example, a direct methanol fuel cell (DMFC) system. In this embodiment, the electrode structure 12 comprises an inorganic (i.e., noncarbonaceous) support substrate 14 having one or more discrete porous regions, wherein the one or more discrete porous regions is defined by an array of acicular pores 16 disposed across the top surface area of the electrode structure 12 such that at least a portion of the blocking layer 10 covers the top surface area and protrudes into the array of acicular pores 16. As shown, the palladium blocking layer 10 is a substantially voidless metallic palladium membrane, and the support substrate 14 is porous silicon (e.g., a bulk silicon matrix having a plurality of acicular pores). Moreover, because of the crystalline nature associated with silicon and palladium, the support substrate 14 may be fusion bonded together with the palladium blocking layer 10 (optionally with an interposing metallic glue layer) such that the opposing crystalline lattices commingle.

Thus, and in view of the foregoing, an aspect of the present invention relates to the use of an inorganic support substrate support structure for carrying a metallic blocking layer thereon. Preferably, the inorganic support substrate is porous silicon, a sol-gel, or a silicon/sol-gel combination. With respect to the porous silicon substrates (and/or support structures) of the present invention, these may be formed by silicon micro-machining and/or wet chemical techniques (employed by the semiconductor industry) such as, for example, anodic polarization of silicon in hydrofluoric acid. As is appreciated by those skilled in the art, the anodic polarization of silicon in hydrofluoric acid (HF) is a chemical dissolution technique and is generally referred to as HF anodic etching; this technique has been used in the semiconductor industry for wafer thinning, polishing, and the manufacture of thick porous silicon films. (See, e.g., Eijkel, et al., "A New Technology for Micromachining of Silicon: Dopant Selective HF Anodic Etching for the Realization of Low-Doped Monocrystalline Silicon Structures," *IEEE Electron Device Ltrs.*, 11(12): 588–589 (1990)). In the context of the present invention, it is to be understood that the porous silicon may be nanoporous silicon (i.e., average pore size <2 nm), mesoporous silicon (i.e., average pore size of 2 nm to 50 nm), or macroporous silicon (i.e., average pore size >50 nm). In addition, the porous regions of the silicon may be of any morphology such a, for example, a branched and interconnecting network of mesoporous and macroporous acicular pores as well as a "Kielovite" porous structure.

More specifically, porous silicon substrates useful in the context of the present invention may be formed by a photoelectrochemical HF anodic etching technique, wherein selected oxidation-dissolution of silicon occurs under a controlled current density. (See, e.g., Levy-Clement et al., "Porous n-silicon Produced by Photoelectrochemical Etching," *Applied Surface Science*, 65/66:408–414 (1993); M. J. Eddowes, "Photoelectrochemical Etching of Three-Dimensional Structures in Silicon," *J. Electrochem. Soc.*, 137 (11):3514–3516 (1990).) An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes). The photoelectrochemical HF anodic etching of n-type silicon, for example, depends upon, among other things, the existence of holes ($h^+$) at or near the silicon surface/solution interface. As is appreciated by those skilled in the art, such holes may be generated by illumination of the silicon surface (n-type); and the holes' transport or flux to the silicon/solution interface may be controlled by an applied potential bias (together with its associated electric field). Once at or near the silicon/ solution interface, the photogenerated holes may take part in oxidation-reduction reactions with surface atoms. In a suitable electrolyte HF solution, oxidation-reduction will be followed by dissolution of the oxidation product such that etching will proceed. (Note that for p-type silicon, holes are readily available so there is generally no need for photo-illumination.) For purposes of enhanced clarity, FIGS. 3–8 show various porous silicon substrates that are useful as inorganic support substrates in accordance with certain exemplary embodiments of the present invention.

Several chemical oxidation-dissolution models have been reported to explain the reaction mechanism that occurs during the electrochemical HF anodic etching of silicon. Perhaps, the most popular model is the one proposed by Lehmann and Gosele. (Lehmann et al., "Porous Silicon Formation: A Quantum Wire Effect," *Applied Physics Letter,* 58(8)856–858 (1991)). The mechanism proposed by Lehmann and Gosele is schematically depicted below in chemical equation (4).

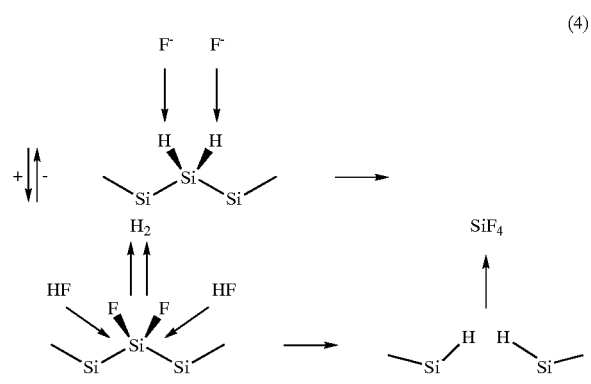

(4)

According to the Lehmann and Gosele model as represented by chemical equation (4), silicon, when immersed in a HF solution, will form a Si—H bond on the surface. The holes and their transport to or near the silicon surface/solution interface (caused by supplying a voltage together IR illumination for n-type silicon) reduces the strength of the Si—H bonds thereby allowing formation of Si—$F_2$, which, in turn, results in a weakening of the Si—Si bonds. Hydrofluoric acid form the solution then causes the weakened Si—Si bond to break, thereby causing the formation of $SiF_4$, which, in turn, goes into the surrounding solution.

In order to form porous silicon substrates by a photoelectrochemical HF anodic etching technique as described above, it is necessary to either obtain or construct an anodic etching cell. In this regard, a suitable anodic etching cell may be obtained commercially from Advanced Micromachining Tools GmbH (Frankenthal, Germany); alternatively, an appropriate anodic etching cell may be constructed.

As also noted above, another aspect of the present invention relates to the use of sol-gel derived support structures for carrying a metallic blocking layer thereon. Thus, and in one aspect, the present invention is directed to a sol-gel derived electrode structure (optionally integrated together with a silicon substrate) having integrally associated therewith a metallic blocking layer. As is appreciated by those skilled in the art, sol-gel processes are a way to make dispersed ceramic materials through the growth of metal oxo polymers in a solvent. (see, e.g., Brinker et al., "Sol-Gel Science, the Physics and Chemistry of Sol-Gel Processing," *Academic* (1990).) The chemistry associated with sol-gel processes is based on inorganic polymerization reactions. In this regard, metal oxo polymers may be obtained through hydrolysis and condensation of molecular precursors such as metal alkoxides $M(OR)_Z$ (wherein M=Si, Ti, Al, Zr, V, W, Ir, Mn, Mo, Re, Rh, Nb, Ni, Sr, Ba, Ta, Mg, Co; OR is an alkoxy group and Z is the valence or oxidation state of the metal) (Sanchez et al., "Inorganic and Organometallic Polymers with Special Properties," *Nato ASI Series* (Laine R. M., Ed.), 206:267 (1992)).

The reaction proceeds first through the hydroxylation of metal alkoxides, which occurs upon the hydrolysis of alkoxy groups as follows:

$$M-OR+H_2O \rightarrow M-OH+ROH \quad (5)$$

The mechanism occurs in three steps: (a) nucleophilic attack of the metal M by the oxygen atom of a water molecule; (b) transfer of a proton from the water to an OR group of the metal; and (c) release of the resulting ROH molecule (Livage et al., "Sol-Gel Chemistry of Transition-Metal Oxides," *Progress in Solid State Chemistry*, 18(4):259–341 (1988)).

As soon as reactive hydroxy groups are generated, the formation of branched oligomers and polymers with a metal oxo based skeleton and reactive residual hydroxo and alkoxy groups occurs through a polycondensation process. Depending on experimental conditions, two competitive mechanisms have been described, namely, oxolation and olation.

Oxolation involves the formation of oxygen bridges as follows:

$$M-OH+M-OX \rightarrow M-O-M+XOH \quad (6)$$

(X=H or alkyl group)

As with hydrolysis, oxolation is a three step nucleophilic substitution reaction which occurs through the elimination of $H_2O$ or ROH. Generally, under a stoichiometric hydrolysis ratio ($h=H_2O/M<2$) the alcohol producing condensation is favored, whereas the water forming condensation is favored for larger hydrolysis ratio (h>>2) (Brinker et al., "Sol-Gel Science, the Physics and Chemistry of Sol-Gel Processing," *Academic* (1990)).

Olation, on the other hand, involves the formation of hydroxo bridges as follows:

$$M-OH+HO-M \rightarrow M-(OH)_2-M \quad (7)$$

Olation is a nucleophilic addition reaction that can take place when the coordination of the metallic center is not fully satisfied (N—Z>0). The hydroxo nucleophilic group enters the unsaturated coordination sphere of the metal. This reaction does not need the proton transfer described above (step b) and the removal of a leaving group (step c). Consequently, the kinetics of olation are usually faster than those of oxolation because steps b and c are not necessary (Sanchez et al., "Inorganic and Organometallic Polymers with Special Properties," *Nato ASI Series* (Laine R. M., Ed.), 206:267 (1992)).

In accordance with an aspect of the present invention, these three reactions (hydrolysis, oxolation and olation) may all be involved in the transformation of a metal alkoxide precursor into a metal oxo macromolecular network, where such a metal oxo macromolecular network is referred to herein as a sol-gel derived support structure. The exact structure and morphology of such a sol-gel derived support structure generally depends on the relative contribution of each of these reactions.

In exemplary embodiments of the present invention, a sol-gel derived support structure may be cast into etched or micromachined trenches, channels, and/or pits of a silicon substrate (e.g., a silicon wafer with selectively placed trenches), wherein the sol-gel derived support structure combined with the silicon substrate (together with the catalyst) serves as an electrode of a fuel cell system. In this context, exemplary sol recipes (chemicals are commercially available from Aldrich Chemical Company, Inc., Milwaukee, Wis.) useful in the practice of the present invention are as follows are as follows:

$Pt-RuO_2$

A platinum-ruthenium oxide precursor solution may be prepared by mixing dihydrogen hexahydroxyplatinate (IV) ($H_2Pt(OH)_6$), ruthenium(III) 2-4pentanedionate $Ru(C_5H_7O_2)_3$ with nitric acid ($HNO_3$), ethyl alcohol ($C_2H_5OH$), and de-ionized water. The solution may be refluxed under vigorous stirring at ~70° C. for ~2 hrs to yield a nominal molar ratio of 1:0.5:5:5:0.5 of: $Ru(C_5H_7O_2)_3$:$H_2Pt(OH)_6$:$H_2O$:$C_2H_5OH$: $HNO_3$.

$Pt-RuO_2-SiO_2$

A platinum-ruthenium-silicon oxide precursor solution may be prepared by first mixing hexachloroplatinic acid ($H_2PtCl_6xH_2O$), ruthenium chloride hydrate ($RuCl_3 \cdot XH_2O$) and tetraethoxysilane ($Si(OC_2H_5)_4$) in ethyl alcohol ($C_2H_5OH$). A solution of ammonium hydroxide ($NH_4OH$) and de-ionized water may then added to the refluxing mixture under vigorous stirring at ~70° C. for 2 hrs to yield a nominal molar ratio of 1:0.2:0.5:5:5:0.8 of $RuCl_3 \cdot XH_2O$:Si$(OC_2H_5)_4$:$H_2PtCl_6xH_2O$: $H_2O$:$C_2H_5OH$:$NH_4OH$.

$Pt-RuO_2-TiO_2$

A platinum-ruthenium-silicon oxide precursor solution may be prepared by first mixing dihydrogen hexahydroxyplatinate (IV) ($H_2Pt(OH)_6$) and ruthenium (III) 2–4pentanedionate $Ru(C_5H_7O_2)_3$ in ethyl alcohol, refluxed and stirred at ~70° C. for 3 hrs. Separately, titanium (IV) isopropoxide ($Ti[OCH(CH_3)_2]_4$) may also mixed with ethyl alcohol ($C_2H_5OH$), refluxed and stirred at ~70° C. for 3 hrs. Next, the two solutions may be mixed together, refluxed under stirring at ~70° C. for 3 hrs. Lastly, a solution of nitric acid ($HNO_3$) and de-ionized water may be added to the mixture, refluxed and stirred at ~70° C. for ~2 hrs to yield a nominal molar ratio of 1:0.2:0.5:5:5:0.5 of $Ru(C_5H_7O_2)_3$:$Ti[OCH(CH_3)_2]_4$:$H_2Pt(OH)_6$:$H_2O$:$C_2H_5OH$:$HNO_3$.

Analogous to the porous silicon support structures, the sol-gel derived support structures of the present invention may also have variably pore sizes and pore morphologies. For example, the pore size may be selectively adjusted by the incorporation of polystyrene latex particles (e.g., latex beads or microspheres) into the sol precursor solution, wherein latex particles have average diameters ranging from 0.05 to 10 μm. In addition, the sol-gel may also have a filler component such as, for example, sub-micron ruthenium oxide particles ranging from 5 to 80 volume percent. (see generally, Velev and Kaler, *Adv. Mater.* 12(7):531–534 (2000); and Kulinowski et al., *Adv. Mater.* 12(11):833–838 (2000)).

As further noted above, the inventive metallic blocking layer in combination with a silicon substrate and/or a sol-gel derived support structure, selectively allows for the transport of hydrogen atoms or protons while blocking substantially all other molecules. In particular, this aspect of the invention enjoys significant utility with respect to preventing "methanol cross-over," which phenomena commonly occurs in electrode assemblies of DMFC systems (wherein the methanol has a tendency to cross-over from the anode to the cathode). As is appreciated by those skilled in the art, the hydrogen ion transport mechanism associated with such DMFC systems may be stated as follows:

1. Hydrogen ions diffuse via the polymer electrolyte (or flowing fluid electrolyte) to the surface of the methanol barrier.
2. The hydrogen ions adsorb to the surface of the methanol barrier.
3. The hydrogen ions gain an electron from the metallic electron cloud and transfers from an adsorbed state on the surface of the film to an absorbed state within the crystalline matrix of the film.
4. The hydrogen atom diffuses through the crystalline matrix by jumping from interstitial site to interstitial site in a manner similar to the Brownian diffusion of molecules through a fluid.
5. The hydrogen atom reaches the surface of the thin film on the side opposite of where it entered, loses an electron to the electron cloud of the metallic film and changes from the absorbed state within the crystalline matrix to the adsorbed state on the surface.
6. The hydrogen ion desorbs from the surface of the methanol barrier into the polymer electrolyte (or flowing fluid electrolyte).
7. The hydrogen ion diffuses away from the methanol barrier via the polymer electrolyte (or flowing fluid electrolyte).

The rate-limiting steps associated with such a transport mechanism are believed to be the electron transfer steps and the bulk diffusion step. In this regard, the diffusion of hydrogen through the crystalline matrix of the metallic blocking layer is known as the Bulk Diffusion step. The rate at which hydrogen diffuses through the matrix is largely controlled by the concentration gradient across the membrane, the thickness of the membrane, and the diffusion coefficient of the membrane as set forth below in the following equation (8):

$$N = \frac{D_T(C_{out} - C_{in})}{\delta} \quad (8)$$

wherein

| | | |
|---|---|---|
| N | Hydrogen flux through the membrane | $ccH_2/cm_2 \cdot sec$ |
| $D_T$ | Hydrogen diffusivity for a given membrane at a given temperature | $cm_2/sec$ |
| $C_{out}$ | Concentration of hydrogen in the membrane materials on the inlet side of the membrane | $ccH_2/ccMetal$ |
| $C_{in}$ | Concentration of hydrogen in the membrane material on the outlet side of the membrane | $ccH_2/ccMetal$ |
| $\delta$ | Thickness of the metal membrane | cm |

Accordingly, the greater the concentration difference between the inlet and outlet side of the membrane, the greater the hydrogen flux. In such a blocking system, the concentration at the inlet and outlet are generally affected only by the concentration of hydrogen ions in the electrolyte and the potential difference between electrolyte and membrane. Thus, the thinner the membrane, the greater the hydrogen flux. The diffusivity of the membrane is largely controlled by the membrane's composition and temperature (the diffusivity of the membrane increases with increasing operating temperature). Materials that typically have high rates of bulk diffusion include the noble metal palladium and the transition metals vanadium, niobium and tantalum (all of which are considered to be within the scope of the present invention).

The rate at which the electron transfer step proceeds is related to the total amount of surface area available for the electron transfer to occur, the suitability of the surface for the electron transfer reaction, and the temperature of the surface. (Preferred metals for fast electron transfer include platinum and palladium.) The electron transfer reaction generally only occurs at specific locations on a membrane surface. These reactions sites have a set density depending on how the surface of the membrane is prepared. The greater the surface area of the membrane the greater the total number of reactions sites where electron transfer can occur. In order to facilitate the electron transfer reactions, electrons from the metallic membrane need to be readily available. In order for this to occur, the surface of the membrane is preferably a metal with minimal adsorbed contaminants or oxide deposits. In general, increasing the temperature of the reaction system causes an increase of the rate at which the electron transfer reactions occur. In this regard, vanadium, niobium and tantalum all have bulk diffusion rates higher than that of palladium at similar temperatures; however, these metals all readily form layers of tightly bound oxides that greatly inhibit the electron transfer reaction. As a result, and although the bulk diffusion rate is greater in these metals, the actual rate of diffusion through these metals is much lower than a comparable palladium film under the same operating conditions.

In order to incorporate the high diffusion rates and relatively lower cost of the transition metals with the fast electron transfer reaction rate of palladium, a layered membrane structure may be formed in accordance with certain embodiments of the present invention. This structure generally comprises a central transition metal diffusion layer, such as vanadium, together with a thin palladium surface reaction layer on either side. Such a metallic membrane may be either be a solid self-supported metallic film, or it may be deposited into a porous matrix (e.g., porous silicon substrates and/or sol-gel derived support structures as disclosed herein).

In the context of the present invention, there are several different methods available for depositing a metallic membrane layer (depending on the material being deposited and the structure of the underlying substrate). In the case of a transition metal foil, no deposition process needs to occur as processing is simply a matter of preparing the surface in such a way so as to enhance the electron transfer reaction. Alternatively, when depositing the metallic layer onto a porous matrix, the metal needs to be deposited in such a way as to ensure intimate contact with the surrounding pore surfaces of the underlying bulk matrix. In this way, delamination and strain effects caused by crystal lattice expansion are minimized by virtue of there being a support matrix around the metal. Furthermore, when metal deposition transcends the stretch of the porous cavity, the possibility of buckling of the film is minimized to only deflection when the film experiences the lateral stress induced by swelling of the film during proton (hydrogen) migration since it is supported by the surrounding porous walls. As is appreciated by those skilled in the art, a metallic film of palladium may be deposited on a silicon substrate and/or a sol-gel derived support structure by, for example, electroplating, physical vapor deposition, sputtering, thermal evaporation, e-beam evaporation, and electroless deposition, or a combination thereof.

While the metallic blocking layers of the present invention have been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

We claim:

1. A blocking layer integrally associated with a top surface area of an electrode structure of a fuel cell system, characterized in that the electrode structure comprises an inorganic support substrate having one or more discrete porous regions, wherein the one or more discrete porous regions is defined by an array of acicular pores disposed across the top surface area of the electrode structure, and wherein at least a portion of the blocking layer covers the top surface area and protrudes into the array of acicular pores, and wherein the blocking layer is a substantially voidless metallic membrane that is substantially impermeable to at least methanol and is substantially permeable to hydrogen atoms, and wherein the support substrate is a cathode structure.

2. A blocking layer integrally associated with a top surface area of an electrode structure of a fuel cell system, characterized in that the electrode structure comprises an inorganic support substrate having one or more discrete porous regions, wherein the one or more discrete porous regions is defined by an array of acicular pores disposed across the top surface area of the electrode structure, and wherein at least a portion of the blocking layer covers the top surface area and protrudes into the array of acicular pores, and wherein the blocking layer is a substantially voidless metallic membrane that is substantially impermeable to at least methanol and is substantially permeable to hydrogen atoms. and wherein the support substrate comprises a sol-gel.

3. The electrode structure of claim 2 wherein the sol-gel is platinum ruthenium dioxide.

4. An electrode assembly adapted for use with a fuel cell system the electrode assembly comprising an anode and an opposing cathode: (1) the anode having one or more discrete anode porous regions, wherein the one or more discrete anode porous regions is defined by an array of anodic acicular pores, and wherein a top surface of the anode has thereon a metallic blocking layer defined by a metallic membrane that is substantially impermeable to at least methanol and is substantially permeable to hydrogen atoms; and (2) the cathode having one or more discrete cathode porous regions, wherein the one or more discrete cathode porous regions is defined by an array of cathodic acicular pores, and wherein the anode and the cathode are spaced apart and substantially parallel to each other so as to defined a spaced apart region, and wherein the spaced apart region is adjacent to the metallic blocking layer, and wherein the anode and the cathode comprise a sol-gel.

5. The electrode structure of claim 4 wherein the sol-gel is platinum ruthenium dioxide.

* * * * *